(12) United States Patent
Clemen

(10) Patent No.: US 8,221,080 B2
(45) Date of Patent: Jul. 17, 2012

(54) METHOD FOR IMPROVING THE FLOW CONDITIONS ON THE PROPELLER OR FAN OF AN AIRCRAFT ENGINE AND ACCORDINGLY DESIGNED HUB CONE

(75) Inventor: Carsten Clemen, Mittenwalde (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 378 days.

(21) Appl. No.: 12/508,452

(22) Filed: Jul. 23, 2009

(65) Prior Publication Data

US 2010/0021310 A1    Jan. 28, 2010

(30) Foreign Application Priority Data

Jul. 28, 2008   (DE) .................. 10 2008 035 160

(51) Int. Cl.
*B64C 11/14*        (2006.01)
(52) U.S. Cl. ........................................... 416/94
(58) Field of Classification Search ............. 416/94, 416/90 A, 245 R, 93 R, 93 A, 244 B, 91, 416/90 R; 415/914
See application file for complete search history.

(56) References Cited

U.S. PATENT DOCUMENTS 2,726,725 A * 12/1955 Nichols ........................... 416/94
2,928,475 A *  3/1960 Doherty et al. ................. 416/94

FOREIGN PATENT DOCUMENTS

| GB | 372134 | | 2/1932 |
|---|---|---|---|
| GB | 372134 A | * | 2/1932 |
| GB | 773950 | | 5/1957 |

OTHER PUBLICATIONS

German Search Report dated Jan. 16, 2009 from counterpart German patent application.

* cited by examiner

*Primary Examiner* — Richard Edgar
(74) *Attorney, Agent, or Firm* — Timothy J. Klima; Shuttleworth & Ingersoll, PLC

(57) ABSTRACT

At a propeller (1) or a fan (2) of an aircraft engine, part of the inflowing air—at the air stagnation point forming at the tip (8*a*) of the hub cone (8)—is conducted into an interior of a hub cone via air inlet openings (9) and, via air outlet openings (10) in an area with minimum static pressure at the downstream end of the hub cone, on a circumference of the latter and at a velocity essentially corresponding to the velocity of the air inflow, is injected into a thick boundary layer on the hub cone, essentially in the direction of flow, thereby accelerating the boundary layer to the velocity of the air inflow. This enables the inflow of air also to the root areas (4*a*, 6*a*) of the fan blades/propeller blades (4, 6), to be effected at an aerodynamically favorable, less steep inflow angle.

9 Claims, 1 Drawing Sheet

Figure 1:
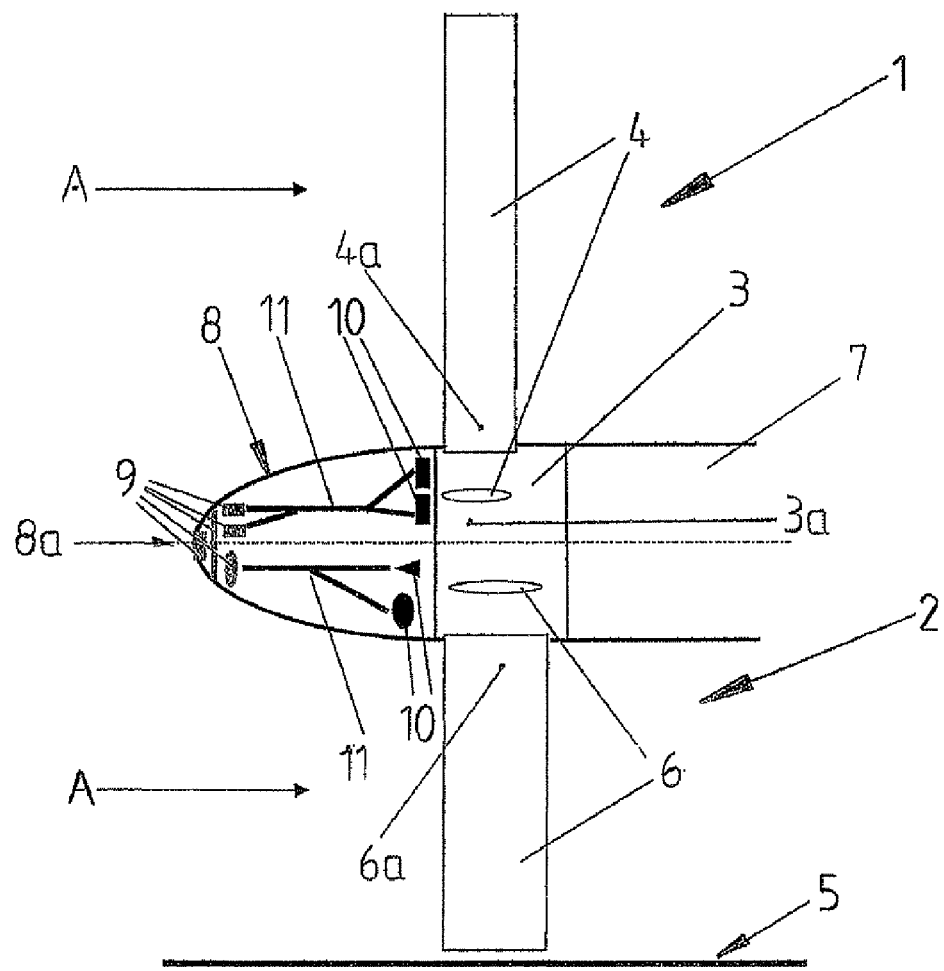

METHOD FOR IMPROVING THE FLOW CONDITIONS ON THE PROPELLER OR FAN OF AN AIRCRAFT ENGINE AND ACCORDINGLY DESIGNED HUB CONE

This application claims priority to German Patent Application No. 10 2008 035 160.1, filed Jul. 28, 2008, which application is incorporated by reference herein.

This invention relates to a method for improving the flow conditions on the propeller or fan of an aircraft engine and furthermore, to the design of a hub cone for the propeller or the fan of an aircraft engine.

The propeller or the fan of an aircraft engine includes a hub connected to a shaft driven by the turbine and having several propeller blades or fan blades, respectively, attached to its periphery as well as a hub cone upstreamly connected to the hub and co-rotating with the latter. Among others, the hub cone provides for directing the air inflow as favorably as possible to the hub profile of the fan or propeller, respectively, and to the fan blade or propeller blade roots. Along the surface of the hub cone, a friction-influenced boundary layer is formed, whose thickness gradually increases in the direction of flow. The boundary layer, which may amount to several millimetres, entails—in dependence of its thickness—that the air inflow to the hub profile of the fan or the propeller, respectively, is very slow and features a very steep inflow angle. A flow separation resulting therefrom at the fan blade or propeller blade areas adjoining the hub or the hub profile, respectively, leads to flow losses and unfavorable outflow from the propeller or fan which is likely to affect efficiency and the flow conditions in the subsequent engine components.

In a broad aspect the present invention provides a method for improving the flow conditions on the propeller or fan of an aircraft engine and specifies a hub cone design for the implementation of the method such that flow separation at the fan blades or propeller blades, respectively, is minimized and the resultant negative effect on the flow conditions and the efficiency of the engine is reduced.

The present invention, in its basic concept, provides that, at the air stagnation point forming at the tip of the hub cone associated to the propeller or fan, part of the air inflow is conducted into the hub cone and, at a velocity corresponding to the air inflow, is injected into the thick boundary layer on the circumference of the hub cone in the direction of flow in an area with minimum static pressure, i.e. shortly before the propeller or fan. Thus, the boundary layer is accelerated shortly before the propeller or fan and adopts the velocity of the inflowing air, with the effect that the air impinges also on the hub-near root area of the fan or propeller blades, respectively, at a less steep inflow angle, resulting in favorable flow conditions on the fan or propeller and on the subsequent engine components, having advantageous effects on efficiency.

A hub cone designed on the basis of the method according to the present invention is provided—in the area of its tip forming a stagnation point for the inflowing air—with at least one air inlet opening joined via connecting lines disposed inside of the hub cone to a plurality of air outlet openings circumferentially distributed on the hub cone shortly before the fan or propeller.

On the hub tip, an air inlet opening may be provided in central arrangement or as annular slot. Likewise, several air inlet openings may be annularly disposed. The connecting lines between the air inlet openings and the air outlet openings can be tubes or ducts integrated into the hub cone.

The air outlet openings are designed such that the air supplied via the connecting lines is blown into the boundary layer in the direction of flow and as parallel as possible to the outer surface of the hub cone, actually at a velocity which approximately corresponds to that of the inflowing air. For this purpose, the air outlet openings are preferably provided as nozzle bodies.

In accordance with another feature of the present invention, the air outlet nozzles can be preceded by either one air attenuation chamber each, or a common air attenuation chamber, to effect on the circumference of the hub cone a uniform supply of air into the boundary layer and uniform acceleration thereof.

An embodiment of the present invention is more fully described in light of the accompanying drawing. In the drawing, FIG. 1 shows—in highly simplified, schematic form—above the centerline a propeller and below the centerline a fan with a hub cone associated to the latter, and FIG. 2 shows—also in highly simplified, schematic form—an enlarged sectional view of a hub cone with two different variants of air introduction into a boundary layer.

Figure 2:
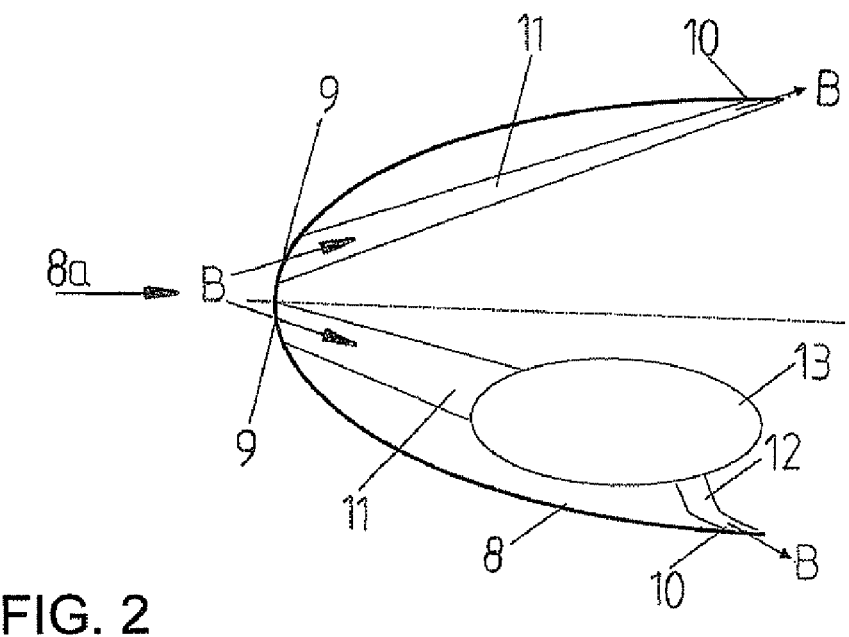

FIG. 1 shows—for simplicity in one and the same view—a propeller 1 and a fan 2 for an aircraft engine, each including propeller blades 4 attached to a hub 3 or fan blades 6 rotating within a casing 5, respectively. The hub 3 is downstreamly connected to a shaft 7 driven by a turbine (not shown) and upstreamly to a hub cone 8. Among others, the hub cone 8 serves to conduct, with minimum disturbance, the air inflow A impinging at the level of the hub 3 on the propeller 1 or fan 2, respectively, to the hub profile 3a and, situated near the hub profile 3a, to the root areas 4a or 6a of the propeller blades 4 or the fan blades 6, respectively.

In the area of the tip 8a of the hub cone 8, i.e. at the stagnation point of the inflowing air, air inlet openings 9 are provided which can be arranged immediately centrically or annularly on the tip 8a or also be provided as annular slots. At the end of hub cone 8 remote from the tip 8a, i.e. near the propeller 1 or the fan 2, respectively, and where the static pressure of the air inflow A is minimum, circumferentially distributed air outlet openings 10 are provided connecting to the air inlet openings 9 via connecting lines 11. The air outlet openings 10 are, as shown in FIG. 2, provided as nozzle bodies 12 oriented essentially in the direction of flow or to the greatest possible extent in parallel with the surface of the hub cone 8 and being preceded, as also shown in FIG. 2, by an air attenuation chamber 13, if applicable.

As a result of the static pressure decrease between the stagnation point 8a (tip 8a of the hub cone) provided with the air inlet openings 9 and the area of the hub cone 8 situated shortly before the hub 3 of the propeller or fan, respectively, and having the air outlet openings 10 or the nozzle bodies 12, respectively, the air tapped at the stagnation point from the air inflow A automatically flows, with corresponding velocity, via the connecting lines 11 to the air outlet openings 10, i.e. to the position of injection into the thick boundary layer existing on the circumference of the hub cone 8. The air outlet openings 10, which preferably are designed as nozzle bodies 12, are dimensioned such that the velocity of the air B exiting there and being injected into the boundary layer has a value which corresponds to the velocity of the air inflow to the propeller or fan, respectively, thereby accelerating the boundary layer to the velocity of the air inflow A.

Owing to the boundary layer being energized, accelerated and thinned close to the propeller 1 or fan 2, respectively, the inflow angle of the air impinging on the propeller blades 4 or fan blades 6, respectively, will be aerodynamically favorable also in the hub-near areas (root areas 4a, 6a), thereby reducing the flow losses on the propeller 1 or the fan 2, respectively, improving the flow conditions on the subsequent engine components and, finally, enhancing the efficiency of the engine.

LIST OF REFERENCE NUMERALS

1 Propeller
2 Fan
3 Hub
3a Hub profile of 3
4 Propeller blade
4a Root area of 4
5 Casing of 2
6 Fan blade
6a Root area of 6
7 Shaft
8 Hub cone
8a Tip of 8, stagnation point
9 Air inlet openings
10 Air outlet openings
11 Connecting lines
12 Nozzle body
13 Air attenuation chamber
A Air inflow
B Air injected into boundary layer

What is claimed is:

1. A method for improving flow conditions on a propeller or fan of an aircraft engine, comprising:
providing the propeller or fan with a hub cone and supplying same with an air inflow (A);
at an air stagnation point at an upstream tip of the hub cone, conducting a part (B) of the inflowing air into an interior of the hub cone through at least one connecting line;
in an area with minimum static pressure at a downstream end of the hub cone, on a circumference of the hub cone and at a velocity essentially corresponding to a velocity of the air inflow, injecting the part (B) of the air into a thick boundary layer on the hub cone in the direction of flow, thereby accelerating the boundary layer to the velocity of the air inflow and reducing its thickness; and
providing the at least one connecting line with a portion of decreasing area to accelerate the air flowing through and exiting the connecting line.

2. A hub cone for a propeller or a fan of an aircraft engine, comprising:
at least one air inlet opening positioned in an area of a tip of the hub cone forming a stagnation point for inflowing air, the at least one air inlet opening for conducting a part (B) of the inflowing air (A) into an interior of the hub cone;
a plurality of air outlet openings annularly positioned at a downstream end of the hub cone remote from the hub tip; and
a plurality of connecting lines extending through an interior of the hub cone for connecting the at least one air inlet opening to the air outlet openings and conducting the part (B) of the inflowing air (A) to the air outlet openings, the air outlet openings injecting the part (B) into a thick boundary layer on an exterior circumference of the hub cone in a direction of the inflowing air (A), in an area with minimum static pressure, and at a velocity essentially corresponding to a velocity of the inflowing air (A), thereby accelerating the boundary layer to the velocity of the inflowing air (A) and reducing a thickness of the boundary layer;
at least one of the connecting lines having a portion of decreasing area to accelerate the air flowing and exiting the connecting lines via the air outlet openings.

3. The hub cone of claim 2, wherein the air inlet opening is centrally arranged at the stagnation point.

4. The hub cone of claim 2, wherein the air inlet opening is an annular slot.

5. The hub cone of claim 2, wherein the at least on air inlet opening includes several air inlet openings annularly arranged on the hub cone.

6. The hub cone of claim 2, wherein the connecting lines are at least one of tubes extending in the interior of the hub cone and ducts integrated into the hub cone.

7. The hub cone of claim 2, wherein the air outlet openings are arranged such that the part (B) of the air enters the boundary layer essentially parallel to a wall of the hub cone.

8. The hub cone of claim 2, wherein at least one of the air outlet openings is a nozzle body.

9. The hub cone of claim 2, and further comprising at least one attenuation chamber in the hub cone connected by at least one of the connecting lines between the air inlet opening and an air outlet opening.

* * * * *